United States Patent
Banumathy et al.

(10) Patent No.: US 7,514,511 B2
(45) Date of Patent: Apr. 7, 2009

(54) FREE RADICAL POLYMERIZATION PROCESS AND POLYMERS OBTAINED THEREBY

(75) Inventors: Balaganesan Banumathy, Hsinchu (TW); Wen-Yueh Ho, Taichung (TW); Tun-Fun Way, Hsinchu (TW); Lien Tai Chen, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 537 days.

(21) Appl. No.: 11/216,154

(22) Filed: Sep. 1, 2005

(65) Prior Publication Data

US 2006/0063900 A1 Mar. 23, 2006

(30) Foreign Application Priority Data

Sep. 23, 2004 (TW) .............................. 93128826 A

(51) Int. Cl.
*C08F 2/04* (2006.01)
*C08F 26/06* (2006.01)
*C08F 20/54* (2006.01)

(52) U.S. Cl. ........................ 526/233; 526/193; 526/204; 526/234; 526/236; 526/265; 526/303.1; 526/341

(58) Field of Classification Search ................ 526/193, 526/204, 233, 234, 236, 265, 303.1, 341
See application file for complete search history.

(56) References Cited

FOREIGN PATENT DOCUMENTS

| CN | 1534048 A | * 10/2004 |
|---|---|---|
| CN | 1560097 A | 1/2005 |
| WO | WO-02/079269 A1 | 10/2002 |
| WO | WO-2004/078811 A1 | 9/2004 |

OTHER PUBLICATIONS

Mihailescu et al. Revue Roumaine de Chimie (1989), 34(7), 1535-40.*
Balakrishnan et al. Indian Journal of Chemistry, section A (1996), 35A(3), 201-05.*
Cheng et al. Macromolecular Symposia (2004), 216 (Contributions from 8th Pacific Polymer Conference, 2003), 9-16.*

* cited by examiner

*Primary Examiner*—Helen L. Pezzuto
(74) *Attorney, Agent, or Firm*—Birch, Stewart, Kolasch & Birch, LLP

(57) ABSTRACT

Free radical polymerization process for preparing polymers with low polydispersity index and polymers obtained thereby. The process includes polymerizing at least one reactive monomer with at least one initiator and at least one ionic liquid (serving as solvent) to obtain polymers having a low polydispersity index of less than 1.5, wherein the reactive monomer is a nitrogen-containing monomer. In addition, the free radical polymerization processes have reaction time within 3 hours.

13 Claims, No Drawings

FREE RADICAL POLYMERIZATION PROCESS AND POLYMERS OBTAINED THEREBY

BACKGROUND

The present invention relates to a free radical polymerization, and more particularly to a free radical polymerization for preparing polymers with low polydispersity index.

Recently, with increased maturity of polymer technologies, polymer applications are involved in not only traditional plastic and synthetic resin industries but also high technology industries such as electronics, optoelectronics, communications and biotechnologies. Some relative polymer materials with specific properties are critical for related industries. For example, photoresistant reagents for preparation of nano-type devices and nano-polymer hybrid materials for dramatically enhancing mechanical properties are all much sought after.

The properties of polymer materials are dependent on configuration. For example, polymerization degrees, molecular weight distribution and components thereof behave in relation to the performance of the polymer materials. The traditional active cation and anion polymerization methods can be used to control the polymerization degree of some monomers and narrow distribution of molecular weight. However, they are limited in their ability to further narrow molecular weight distribution, resulting in polymer products with polydispersity index (defined as the ratio of the weight average molecular weight to number average molecular weight, Mw/Mn) generally more than 2. As well, the variety of monomers applied to the above polymerization methods is limited, and strict reaction conditions and long reaction times thereof also restrict use in related industries.

In 1998, CSIRO disclosed an active free radical polymerization method called reversible addition-fragmentation chain transfer process (RAFT process) to prepare polymer products with narrow molecular weight distribution and further control the polymer chain length. The so-called RAFT process is a combination of general procedures for traditional free radical polymerizations with the addition of a fixed amount of reversible addition-fragmentation chain transfer reagent (RAFT reagent).

However, it is very inefficient for conventional active radical polymerization with RAFT reagent, since monomers produce polymerization only under nitrogen atmosphere and very dilute solution conditions to provide polymer products with narrow molecular weight distribution. Therefore, the above problem causes longer reaction time and incomplete reaction of polymerization, making it neither economical nor convenient.

Mays et al. in WO 02/079269 disclose a free radical polymerization process with ionic liquid, substituting general organic solvent, as solvent. The polymerization can be performed completely within 4 hours, thereby increasing the efficiency of polymerization. Due to inferior compatibility between the employed ionic liquid and monomers, the polymers prepared by the process have wider molecular weight distribution. Thus, the described free radical polymerization process cannot meet current market demands for reducing PDI to less than 1.5. Therefore, a novel free radical polymerization process for further reduction of PDI of obtained polymer products is desirable.

SUMMARY

For preparing polymers with low polydispersity index, embodiments of the invention provide a radical polymerization process. The process provides at least one free radically polymerizable monomer to react with at least one initiator in the presence of at least one ionic liquid to undergo polymerization, producing polymers with polydispersity index less than 1.5. The free radically polymerizable monomer can be nitrogen-containing monomer, and the ionic liquid has a structure shown by formula (I), (II), (III) or (IV):

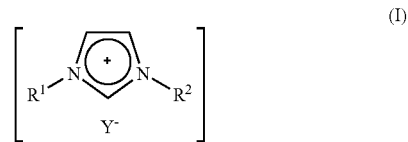

(I)

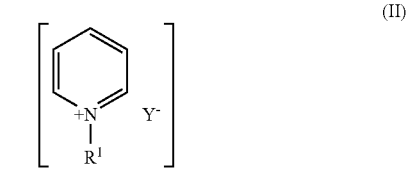

(II)

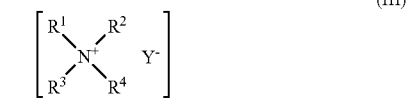

(III)

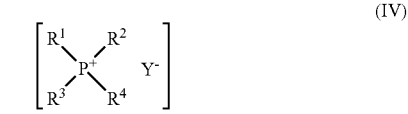

(IV)

wherein,

Y— can be $SbF_6$—, $PF_6$—, $BF_4$—, $(CF_3SO_2)_2N$—, $CF_3SO_3$—, $CH_3CO_2$—, $CF_3CO_2$—, $NO_3$—, Cl—, Br—, or I—; and $R^1$, $R^2$, $R^3$ and $R^4$ can be each independently $C_{1-10}$ alkyl group, $C_{1-10}$ fluoroalkyl group, or $C_{1-10}$ perfluoroalkyl group.

Embodiments of the invention further provide polymers with low polydispersity index, comprising the reaction product of the following reactants undergoing a polymerization in the presence of at least one ionic liquid as solvent:

at least one free radically polymerizable monomer; and at least one initiator, wherein the free radically polymerizable monomer can be nitrogen-containing monomer, and the ionic liquid has a structure shown by formula (I), (II), (III) or (IV):

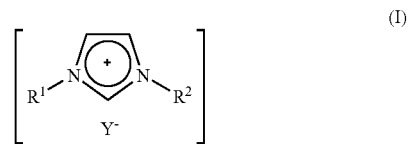

(I)

-continued

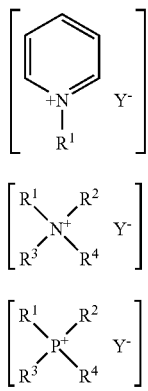

wherein,

Y— can be SbF$_6$—, PF$_6$—, BF$_4$—, (CF$_3$SO$_2$)$_2$N—, CF$_3$SO$_3$—, CH$_3$CO$_2$—, CF$_3$CO$_2$—, NO$_3$—, Cl—, Br—, or I—; and R$^1$, R$^2$, R$^3$ and R$^4$ can be each independently C$_{1-10}$ alkyl group, C$_{1-10}$ fluoroalkyl group, or C$_{1-10}$ perfluoroalkyl group.

In embodiments of the invention, PDI of the above polymers can be less than 1.5, preferably 1.3.

DETAILED DESCRIPTION

According to embodiments of the invention, the free radical polymerization process for preparing polymers with low polydispersity index includes polymerizing at least one free radically polymerizable monomer with at least one initiator in the present of at least one ionic liquid as solvent.

In embodiments of the invention, the free radically polymerizable monomer is a nitrogen-containing monomer. The nitrogen-containing monomer can be pyridine, nitrile, or amide, substituted by polymerizable functional group, such as vinylpyridine, acrylonitrile, or n-isopropylacrylamide. The polymerizable functional group comprises acryloyl, epoxy, isocyanato, or functional group with reactive double bond.

As a main feature and a key aspect, the ionic liquids used in embodiments of the invention are selected to be compatible with nitrogen-containing monomers. Ionic liquids exhibit high thermal stability, non-flammability, and non-flashpoint, and exist in liquid state over a wide range of temperatures. The ionic liquids according to embodiments of the invention can remain liquid at 40 to 200° C., represented by formula (I), (II), (III) or (IV):

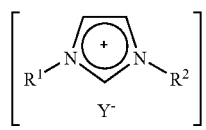

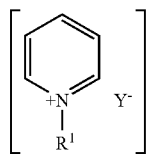

wherein,

Y— can be SbF$_6$—, PF$_6$—, BF$_4$—, (CF$_3$SO$_2$)$_2$N—, CF$_3$SO$_3$—, CH$_3$CO$_2$—, CF$_3$CO$_2$—, NO$_3$—, Cl—, Br—, or I—; and R$^1$, R$^2$, R$^3$ and R$^4$ can be each independently C$_{1-10}$ alkyl group, C$_{1-10}$ fluoroalkyl group, or C$_{1-10}$ perfluoroalkyl group.

In embodiments of the invention, at least one hydrogen atom bonded to the carbon composing imidazole of ionic liquid represented by formula (I) or pyridine of ionic liquid represented by formula (II) can be substituted optionally by fluorine, C$_{1-10}$ alkyl group, C$_{1-10}$ fluoroalkyl group, or C$_{1-10}$ perfluoroalkyl group.

According to embodiments of the present invention, the ionic liquid, represented by formula (I), can be BmimPF$_6$ (Bmim: 1-butyl-3-methyl imidazolium), BmimBF$_4$, BmimCF$_3$SO$_3$, BmimCH$_3$CO$_2$, BmimCF$_3$CO$_2$, BmimCl, BmimBr, Bmim(CF$_3$SO$_2$)$_2$N, OmimPF$_6$(Omim: 1-octyl-3-methyl imidazolium), OmimBF$_4$, OmimCF$_3$SO$_3$, OmimCH$_3$CO$_2$, OmimCF$_3$CO$_2$, OmimCl, OmimBr, Omim(CF$_3$SO$_2$)$_2$N, DmimPF6 (Dmim: 1-decyl-3-methyl imidazolium), DmimBF$_4$, DmimCF$_3$SO$_3$, DmimCH$_3$CO$_2$, DmimCF$_3$CO$_2$, DmimCl, DmimBr, or Bmim(CF$_3$SO$_2$)$_2$N. Properties of several ionic liquids represented by formula (I) are shown in Table 1.

TABLE 1

| ionic liquid | melting point (° C.) | decomposition point (° C.) | viscosity (cP, 25° C.) | density (kg/m$^3$, 25° C.) |
|---|---|---|---|---|
| DmimPF$_6$ | 34 | 390 | — | — |
| OmimPF$_6$ | −75 | 416 | — | 1400 |
| BmimPF$_6$ | 4 | 390 | 312 | 1370 |
| DmimBF$_4$ | −77.5 | — | — | — |
| BmimBF$_4$ | 75 | 407 | 219 | 1119 |
| Bmim(CF$_3$SO$_2$)$_2$N | −89 | 402 | 54.2 | 1429 |

The ionic liquids can also be 1-butyl-1-methyl pyrrolidinium bis(trifluoromethylsulfonyl) imide, 1-Methyl-1-butyl-pyrrolidinium dicyanamide, Butyl-methyl pyrrolidinium trifluoromethylsulfonate, 1-butyl-1-methyl pyrrolidinium tetrafluoborate, trihexyl(tetradecyl)phosphonium tris(pentafluoroethyl)trifluorophosphate, 1-butyl-1-methyl pyrrolidinium hexafluorophosphate, trioctylmethylammonium trifluoromethanesulfonate, trioctylmethylammonium hexafluorophosphate, trioctylmethylammonium tetrafluoborate or methyl-trioctylammonium bis(trifluoromethansulfon) imide).

Suitable initiator includes, but is not limited to peroxide, perester, or azo initiator. Representative examples include AIBN, 2,2'-azobis(2-cyano-2-butane), dimethyl 2,2'-azobis (methyl isobutyrate), 4,4'-azobis(4-cyanopentanoic acid), 4,4'-azobis(4-cyanopentan-1-ol), 1,1'-azobis (cyclohexanecarbonitrile), 2-(t-butylazo)-2-cyanopropane, 2,2'-azobis[2-methyl-(N)-(1,1)-bis(hydroxymethyl)-2-hydroxyethyl]propionamide, 2,2'-azobis[2-methyl-N-hydroxyethyl)]propionamide, 2,2'-azobis(N,N'-dimethyleneisobutyramidine) dihydrochloride, 2,2'-azobis (2-amidinopropane) dihydrochloride, 2,2'-azobis(N,N'-dimethyleneisobutyramine), 2,2'-azobis (2-methyl-N-[1,1-bis(hydroxymethyl)-2-hydroxyethyl]propionamide, 2,2'-azobis(2-methyl-N-[1,1-bis (hydroxymethyl)ethyl] propionamide), 2,2'-azobis [2-methyl-N-(2-hydroxyethyl) propionamide], 2,2'-azobis(isobutyramide)dihydrate, 2,2'-azobis (2,2,4-trimethylpentane), 2,2'-azobis(2-methylpropane), dilauroyl peroxide, tertiary amyl peroxides, tertiary amyl peroxydicarbonates, t-butyl peroxyacetate, t-butyl peroxybenzoate, t-butyl peroxyoctoate, t-butyl peroxyneodecanoate, t-butylperoxy isobutyrate, t-amyl peroxypivalate, t-butyl peroxypivalate, di-isopropyl peroxydicarbonate, dicyclohexyl peroxydicarbonate, dicumyl peroxide, dibenzoyl peroxide, potassium peroxydisulfate, ammonium peroxydisulfate, di-tert butyl peroxide, di-t-butyl hyponitrite, or dicumyl hyponitrite.

In embodiments, the weight ratio between the monomer and the initiator can be from 30:1 to 200:1, preferably 50:1 to 150:1. Furthermore, the weight ratio between the monomer and the ionic liquid is not more than 2:3, preferably 1:2. Moreover, the polymers prepared by the above free radical polymerization process have a molecular weight of 4000 to 200000.

According to embodiments of the invention, the free radical polymerization processes have reaction time within 3 hours, and the reaction temperature thereof can be controlled at 30~120° C., preferably 50~120° C.

The following examples are intended to demonstrate this invention more fully without limiting its scope, since numerous modifications and variations will be apparent to those skilled in the art.

EXAMPLE 1

1 g (8.884 mmol) of n-isopropylacrylamide (NIPAM) as monomer, and 2 g of BmimPF$_6$ (1-butyl-3-methyl imidazolium hexafluorophosphate) as solvent were added to a round-bottom flask. Next, 0.02 g of 4,4'-azobis-4-cyanopentanoic acid (ACPA) as initiator was added to the round-bottom flask. After mixing completely for 30 minutes at 65° C., the mixture was cooled to −10° C. to terminate the polymerization, and 10 ml of acetone was added. The solution was precipitated into ethyl ether and centrifuged to remove traces of any unreacted monomer. After washing with H$_2$O/ether (15 mol %) several times, the result was filtered, and condensed, giving 0.8 g of poly(n-isopropylacrylamide) with average molecular weight of 11600 by gel permeation chromatography (GPC) analysis. The polydispersity index (PDI) is 1.20.

The reaction according to Example 1 is shown below.

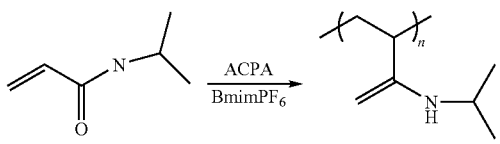

EXAMPLE 2

Example 2 was performed as Example 1 except for substitution of BmimPF6 for BmimBr. The obtained poly(n-isopropylacrylamide) has an average molecular weight of 5100 by GPC analysis and PDI of 1.22.

EXAMPLE 3

Example 3 was performed as Example 1 except for substitution of ACPA for azo-bisisobutyronitril (AIBN). The obtained poly(n-isopropylacrylamide) has an average molecular weight of 6800 by GPC analysis and PDI of 1.23.

EXAMPLE 4

Example 4 was performed as Example 1 except for substitution of 0.02 g of initiator for 0.01 g. The obtained poly(n-isopropylacrylamide) has an average molecular weight of 21000 by GPC analysis and PDI of 1.28.

EXAMPLE 5

Example 5 was performed as Example 2 except for substitution of ACPA for AIBN. The obtained poly(n-isopropylacrylamide) has an average molecular weight of 21000 by GPC analysis and PDI of 1.24.

EXAMPLE 6

1 g (8.884 mmol) of n-isopropylacrylamide as monomer, and 2 g of BmimBF$_4$ (1-butyl-3-methyl imidazolium hexafluorophosphate) as solvent were added to a round-bottom flask. Next, 0.02 g of 4,4'-azobis-4-cyanopentanoic acid (ACPA) as initiator was added to the round-bottom flask. After mixing completely for 120 minutes at 50° C., the mixture was cooled to −10° C. to terminate the polymerization, and 10 ml of acetone was added. The solution was then precipitated into ethyl ether and centrifuged. After washing with H$_2$O/ether (15 mol %) several times, the result was filtered, and condensed, giving poly(n-isopropylacrylamide) with average molecular weight of 5300 by GPC analysis. The PDI is 1.22.

EXAMPLE 7

1 g (8.884 mmol) of n-isopropylacrylamide as monomer, and 2 g of BmimBF$_4$ (1-butyl-3-methyl imidazolium hexafluorophosphate) as solvent were added to a round-bottom flask. Next, 0.02 g of AIBN as initiator was added to the round-bottom flask. After mixing completely for 10 minutes at 90° C., the mixture was cooled to −10° C. to terminate the polymerization, and 10 ml of acetone was added. The solution was precipitated into ethyl ether and centrifuged. After washing with H$_2$O/ether (15 mol %) several times, the result was filtered, and condensed, giving poly(n-isopropylacrylamide) with average molecular weight of 14200 by GPC analysis. The PDI is 1.21.

EXAMPLE 8

1 g (8.884 mmol) of n-isopropylacrylamide as monomer, and 2 g of BmimNTf$_2$ as solvent were added to a round-bottom flask. Next, 0.01 g of ACPA as initiator was added to the round-bottom flask. After mixing completely for 12 minutes at 90° C., the mixture was cooled to −10° C. to terminate the polymerization, and 10 ml of acetone was added. The solution was then precipitated into ethyl ether and centrifuged to remove traces of any unreacted monomer. After washing with H$_2$O/ether (15 mol %) several times, the result was filtered, and condensed, giving poly(n-isopropylacrylamide) with average molecular weight of 12400 by GPC analysis. The PDI is 1.29.

EXAMPLE 9

1 g (8.884 mmol) of n-isopropylacrylamide as monomer, and 2 g of BmimNTf$_2$ as solvent were added to a round-bottom flask. Next, 0.02 g of AIBN as initiator was added to the round-bottom flask. After mixing completely for 140 minutes at 50° C., the mixture was cooled to −10° C. to terminate the polymerization, and 10 ml of acetone was added. The solution was precipitated into ethyl ether and centrifuged to remove traces of any unreacted monomer. After washing with H$_2$O/ether (15 mol %) several times, the result was filtered, and condensed, giving poly (n-isopropylacrylamide) with average molecular weight of 7400 by GPC analysis. The PDI is 1.21.

EXAMPLE 10

1 g of 4-vinylpyridine (4-VP) as monomer, and 2 g of BmimNTf$_2$ as solvent were added to a round-bottom flask. Next, 0.02 g of ACPA as initiator was added to the round-bottom flask. After mixing completely for 150 minutes at 50° C., the mixture was cooled to −10° C. to terminate the polymerization, and 10 ml of acetone was added. The solution was precipitated into ethyl ether and centrifuged to remove traces of any unreacted monomer. After washing with H$_2$O/ether (15 mol %) several times, the result was filtered, and condensed, giving 0.63 g of poly(4-vinylpyridine) with average molecular weight of 4400 by GPC analysis. The PDI is 1.20.

The reaction according to Example 10 is shown below.

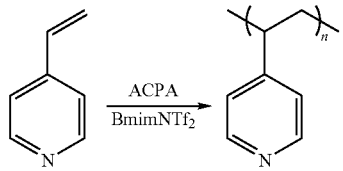

EXAMPLE 11

1 g of 4-vinylpyridine (4-VP) as monomer, and 2 g of BmimBr as solvent were added to a round-bottom flask. Next, 0.02 g of ACPA as initiator was added to the round-bottom flask. After mixing completely for 60 minutes at 65° C., the mixture was cooled to −10° C. to terminate the polymerization, and 10 ml of acetone was added. The solution was precipitated into ethyl ether and centrifuged to remove traces of any unreacted monomer. After washing with H$_2$O/ether (15 mol %) several times, the result was filtered, and condensed, giving poly(4-vinylpyridine) with average molecular weight of 33600 by GPC analysis. The PDI is 1.24.

EXAMPLE 12

1 g of 4-vinylpyridine (4-VP) as monomer, and 2 g of BmimPF$_6$ as solvent were added to a round-bottom flask. Next, 0.01 g of AIBN as initiator was added to the round-bottom flask. After mixing completely for 50 minutes at 65° C., the mixture was cooled to −10° C. to terminate the polymerization, and 10 ml of acetone was added. The solution was then precipitated into ethyl ether and centrifuged to remove traces of any unreacted monomer. After washing with H$_2$O/ether (15 mol %) several times, the result was filtered, and condensed, giving poly(4-vinylpyridine) with average molecular weight of 8800 by GPC analysis. The PDI is 1.39.

EXAMPLE 13

1 g of 4-vinylpyridine (4-VP) as monomer, and 2 g of BmimBr as solvent were added to a round-bottom flask. Next, 0.02 g of AIBN as initiator was added to the round-bottom flask. After mixing completely for 50 minutes at 65° C., the mixture was cooled to −10° C. to terminate the polymerization, and 10 ml of acetone was added. The solution was then precipitated into ethyl ether and centrifuged to remove traces of any unreacted monomer. After washing with H$_2$O/ether (15 mol %) several times, the result was filtered, and condensed, giving poly(4-vinylpyridine) with average molecular weight of 5700 by GPC analysis. The PDI is 1.03.

EXAMPLE 14

Example 14 was performed as Example 13 except for substitution of 0.02 g of AIBN for 0.01 g. The obtained poly(4-vinylpyridine) has an average molecular weight of 8400 by GPC analysis and PDI of 1.26.

EXAMPLE 15

1 g of 4-vinylpyridine (4-VP) as monomer, and 2 g of BmimBr as solvent were added to a round-bottom flask. Next, 0.01 g of AIBN as initiator was added to the round-bottom flask. After mixing completely for 30 minutes at 85° C., the mixture was cooled to −10° C. to terminate the polymerization, and 10 ml of acetone was added. The solution was then precipitated into ethyl ether and centrifuged to remove traces of any unreacted monomer. After washing with H$_2$O/ether (15 mol %) several times, the result was filtered, and condensed, giving poly(4-vinylpyridine) with average molecular weight of 6400 by GPC analysis. The PDI is 1.28.

EXAMPLE 16

1 g of acrylonitrile (AN) as monomer, and 2 g of BmimPF$_6$ as solvent were added to a round-bottom flask. Next, 0.01 g of AIBN as initiator was added to the round-bottom flask. After mixing completely for 110 minutes at 80° C., the mixture was cooled to −10° C. to terminate the polymerization, and 10 ml of acetone was added. The solution was then precipitated into ethyl ether and centrifuged to remove traces of any unreacted monomer. After washing with H$_2$O/ether (15 mol %) several times, the result was filtered, and condensed, giving poly (acrylonitrile) with average molecular weight of 7200 by GPC analysis. The PDI is 1.42.

The reaction according to Example 10 is shown below.

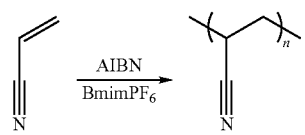

EXAMPLE 17

1 g of acrylonitrile (AN) as monomer, and 2 g of BmimBr as solvent were added to a round-bottom flask. Next, 0.02 g of ACPA as initiator was added to the round-bottom flask. After mixing completely for 90 minutes at 60° C., the mixture was cooled to −10° C. to terminate the polymerization, and 10 ml of acetone was added. The solution was then precipitated into ethyl ether and centrifuged to remove traces of any unreacted monomer. After washing with $H_2O$/ether (15 mol %) several times, the result was filtered, and condensed, giving poly (acrylonitrile) with average molecular weight of 4900 by GPC analysis. The PDI is 1.36.

EXAMPLE 18

1 g of acrylonitrile (AN) as monomer, and 2 g of $BmimBF_4$ as solvent were added to a round-bottom flask. Next, 0.01 g of ACPA as initiator was added to the round-bottom flask. After mixing completely for 130 minutes at 60° C., the mixture was cooled to −10° C. to terminate the polymerization, and 10 ml of acetone was added. The solution was then precipitated into ethyl ether and centrifuged to remove traces of any unreacted monomer. After washing with $H_2O$/ether (15 mol %) several times, the result was filtered, and condensed, giving poly (acrylonitrile) with average molecular weight of 5300 by GPC analysis. The PDI is 1.39.

The reaction conditions and properties of polymer products of Examples 1~18 are shown in Table 2.

nylpyridine)-b-poly(n-isopropylacrylamide)) with average molecular weight of 27742 by GPC analysis. The PDI is 1.20.

EXAMPLE 20

1.68 g of 4-vinylpyridine, 1.0 g of n-isopropylacrylamide, and 2 g of $BmimPF_6$ as solvent were added to a round-bottom flask. Next, 0.056 g of AIBN as initiator was added to the round-bottom flask. After mixing completely for 180 minutes at 65° C., the mixture was cooled to −10° C. to terminate the polymerization, and 10 ml of N,N-Dimethyl acetamide was added. The solution was then precipitated into water and centrifuged to remove traces of any unreacted monomer. After washing with $H_2O$/ethyl acetate (15 mol %) several times, the result was filtered, and condensed, giving 1.4 g of random polymer (poly(4-vinylpyridine)-ran-poly(n-isopropylacrylamide)) with average molecular weight of 33974 by GPC analysis. The PDI is 1.22.

EXAMPLE 21

1.0 g of n-isopropylacrylamide, and 2 g of $BmimBF_4$ as solvent were added to a round-bottom flask. Next, 0.056 g of AIBN as initiator was added to the round-bottom flask. After mixing completely for 20 minutes at 65° C., 1.68 g of 4-vi-

TABLE 2

| | ionic liquid | monomer | initiator | ratio | temperature(° C.) | time (min) | Mn | PDI |
|---|---|---|---|---|---|---|---|---|
| 1 | $BmimPF_6$ | NIPAM | ACPC | 50:1 | 65 | 30 | 11600 | 1.20 |
| 2 | BmimBr | NIPAM | ACPC | 50:1 | 65 | 30 | 5100 | 1.22 |
| 3 | $BmimPF_6$ | NIPAM | AIBN | 50:1 | 65 | 30 | 6800 | 1.23 |
| 4 | $BmimPF_6$ | NIPAM | AIBN | 100:1 | 65 | 30 | 21000 | 1.28 |
| 5 | BmimBr | NIPAM | AIBN | 50:1 | 65 | 30 | 11600 | 1.24 |
| 6 | $BmimBF_4$ | NIPAM | AIBN | 100:1 | 50 | 160 | 5300 | 1.22 |
| 7 | $BmimBF_4$ | NIPAM | ACPC | 100:1 | 90 | 10 | 14200 | 1.21 |
| 8 | $BminNTf_2$ | NIPAM | ACPC | 50:1 | 90 | 12 | 12400 | 1.29 |
| 9 | $BminNTf_2$ | NIPAM | AIBN | 50:1 | 50 | 140 | 7400 | 1.21 |
| 10 | $BminNTf_2$ | 4-VP | ACPA | 50:1 | 50 | 150 | 4400 | 1.20 |
| 11 | $BmimPF_6$ | 4-VP | ACPC | 50:1 | 65 | 60 | 33600 | 1.24 |
| 12 | BmimBr | 4-VP | AIBN | 100:1 | 65 | 50 | 8800 | 1.39 |
| 13 | $BmimPF_6$ | 4-VP | AIBN | 50:1 | 65 | 50 | 5700 | 1.20 |
| 14 | $BmimPF_6$ | 4-VP | AIBN | 100:1 | 65 | 50 | 8400 | 1.26 |
| 15 | BmimBr | 4-VP | AIBN | 100:1 | 80 | 30 | 6400 | 1.28 |
| 16 | $BmimBF_4$ | AN | AIBN | 100:1 | 80 | 110 | 7200 | 1.42 |
| 17 | $BmimBF_4$ | AN | ACPC | 50:1 | 60 | 90 | 4900 | 1.36 |
| 18 | $BminNTf_2$ | AN | ACPC | 100:1 | 60 | 130 | 5300 | 1.39 |

EXAMPLE 19

1.68 g of 4-vinylpyridine as monomer, and 2 g of $BmimBF_4$ as solvent were added to a round-bottom flask. Next, 0.056 g of AIBN as initiator was added to the round-bottom flask. After mixing completely for 40 minutes at 65° C., 1.0 g of n-isopropylacrylamide was added into the resulting mixture. After stirring for 40 minutes, the mixture was cooled to −10° C. to terminate the polymerization, and 10 ml of N,N-Dimethyl acetamide was added. The solution was then precipitated into water and centrifuged to remove traces of any unreacted monomer. After washing with $H_2O$/ethyl acetate (15 mol %) several times, the result was filtered, and condensed, giving 1.2 g of diblock copolymer (poly(4-vinylpyridine was added into the resulting mixture. After stirring for 40 minutes, the mixture was cooled to −10° C. to terminate the polymerization, and 10 ml of N,N-Dimethyl acetamide was added. The solution was then precipitated into water and centrifuged to remove traces of any unreacted monomer. After washing with $H_2O$/ethyl acetate (15 mol %) several times, the result was filtered, and condensed, giving 1.2 g of diblock copolymer (poly(4-vinylpyridine)-b-poly(n-isopropylacrylamide)) with average molecular weight of 32230 by GPC analysis. The PDI is 1.23.

EXAMPLE 22

Example 22 was performed as Example 19 except for substitution of 0.056 g of AIBN for 0.028 g. The obtained poly(4-vinylpyridine) has an average molecular weight of 47800 by GPC analysis and PDI of 1.40.

EXAMPLE 23

1.68 g of 4-vinylpyridine as monomer, and 2 g of BmimBr as solvent were added to a round-bottom flask. Next, 0.056 g of ACPA as initiator was added to the round-bottom flask. After mixing completely for 40 minutes at 65° C., 1.0 g of n-isopropylacrylamide was added into the resulting mixture. After stirring for 40 minutes, the mixture was cooled to −10° C. to terminate the polymerization, and 10 ml of N,N-Dimethyl acetamide was added. The solution was then precipitated into water and centrifuged to remove traces of any unreacted monomer. After washing with $H_2O$/ethyl acetate (15 mol %) several times, the result was filtered, and condensed, giving 1.2 g of diblock copolymer (poly(4-vinylpyridine)-b-poly(n-isopropylacrylamide)) with average molecular weight of 31800 by GPC analysis. The PDI is 1.48.

EXAMPLE 24

1.68 g of 4-vinylpyridine, 1.0 g of n-isopropylacrylamide, and 2 g of BmimBr as solvent were added to a round-bottom flask. Next, 0.056 g of ACPA as initiator was added to the round-bottom flask. After mixing completely for 180 minutes at 65° C., the mixture was cooled to −10° C. to terminate the polymerization, and 10 ml of N,N-Dimethyl acetamide was added. The solution was then precipitated into water and centrifuged to remove traces of any unreacted monomer. After washing with $H_2O$/ethyl acetate (15 mol %) several times, the result was filtered, and condensed, giving 1.4 g of random polymer (poly(4-vinylpyridine)-ran-poly(n-isopropylacrylamide)) with average molecular weight of 28900 by GPC analysis. The PDI is 1.35.

The reaction conditions and properties of polymer products of Examples 19~24 are shown in Table 3.

TABLE 3

| | ionic liquid | 1st monomer | 2nd monomer | initiator | ratio | Mn | PDI | polymer type |
|---|---|---|---|---|---|---|---|---|
| 19 | BmimPF$_6$ | 4-VP | NIPAM | ACPC | 50:1 | 11600 | 1.20 | diblock |
| 20 | BmimPF$_6$ | NIPAM 4-VP | | ACPC | 50:1 | 5100 | 1.22 | random |
| 21 | BmimPF$_6$ | NIPAM | 4-VP | AIBN | 50:1 | 6800 | 1.23 | diblock |
| 22 | BmimPF$_6$ | 4-VP | NIPAM | AIBN | 100:1 | 21000 | 1.40 | diblock |
| 23 | BmimBr | 4-VP | NIPAM | AIBN | 50:1 | 11600 | 1.48 | diblock |
| 24 | BmimBr | NIPAM 4-VP | | AIBN | 100:1 | 5300 | 1.35 | random |

The process can prepare polymers with low polydispersity index without the need for RAFT reagents and proceed with high monomer concentration. The polydispersity index (PDI) of the polymer obtained can be less than 1.5, preferably 1.3. Furthermore, compared with conventional polymerizations, the free radical polymerization processes according to embodiments of the invention do not require processing in highly dilute solution, making them suitable for use with any kind of monomer. In addition, the process can be used not only in the preparation of homopolymer materials but also of diblock or random polymer materials.

While the invention has been described by way of example and in terms of preferred embodiment, it is to be understood that the invention is not limited thereto. It is therefore intended that the following claims be interpreted as covering all such alteration and modifications as fall within the true spirit and scope of the invention.

What is claimed is:

1. A free radical polymerization process, comprising:
reacting at least one free radically polymerizable monomer with at least one initiator in the present of at least one ionic liquid undergoing polymerization to obtain a polymer with a PDI of 1.5 or less,
wherein the free radically polymerizable monomer is nitrogen-containing monomer, and the ionic liquid has a formula (IV), of:

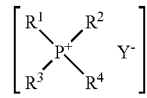

wherein
Y$^-$ is SbF$_6^-$, PF$_6^-$, BF$_4^-$, (CF$_3$SO$_2$)$_2$N$^-$, CF$_3$SO$_3^-$, CH$_3$CO$_2^-$, CF$_3$CO$_2^-$, NO$_3^-$, Cl$^-$, Br$^-$, or I$^-$; and
R$^1$, R$^2$, R$^3$ and R$^4$ are each independently C$_{1-10}$ fluoroalkyl group, or C$_{1-10}$ perfluoroalkyl group.

2. The process as claimed in claim 1, wherein the nitrogen-containing monomer is pyridine, nitrile, or amide, which is substituted by polymerizable functional group.

3. The process as claimed in claim 1, wherein the polymerizable functional group is acryloyl, epoxy, isocyanato, or functional group with reactive double bond.

4. The process as claimed in claim 1, wherein the free radically polymerizable monomer is vinylpyridine or n-isopropylacrylamide.

5. The process as claimed in claim 1, wherein the initiator is peroxide, perester or azo initiator.

6. The process as claimed in claim 1, wherein the weight ratio between the monomer and the initiator is from 30:1 to 200:1, and the weight ratio between the monomer and the ionic liquid is not more than 1:2.

7. The process as claimed in claim 1, wherein the polymer has a number average molecular weight of 4000 to 200000.

8. A free radical polymerization process, comprising:
reacting two free radically polymerizable monomer with at least one initiator in the present of at least one ionic liquid undergoing polymerization to obtain a polymer with a PDI of 1.5 or less,
wherein
the free radically polymerizable monomer is pyridine, nitrile, or amide, substituted by polymerizable functional group; and the ionic liquid has a formula (IV), of:

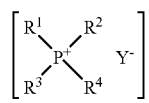

wherein

Y⁻ is $SbF_6^-$, $PF_6^-$, $BF_4^-$, $(CF_3SO_2)_2N^-$, $CF_3SO_3^-$, $CH_3CO_2^-$, $CF_3CO_2^-$, $NO_3^-$, Cl⁻, Br⁻, or I⁻; and $R^1$, $R^2$, $R^3$ and $R^4$ are each independently $C_{1-10}$ fluoroalkyl group, or $C_{1-10}$ perfluoroalkyl group.

9. The process as claimed in claim 8, wherein the polymerizable functional group is acryloyl, epoxy, isocyanato, or functional group with reactive double bond.

10. The process as claimed in claim 8, wherein the free radically polymerizable monomer is vinylpyridine or n-isopropylacrylamide.

11. The process as claimed in claim 8, wherein the initiator is peroxide, perester or azo initiator.

12. The process as claimed in claim 8, wherein the weight ratio between the monomer and the initiator is from 30:1 to 200:1, and the weight ratio between the monomer and the ionic liquid is not more than 1:2.

13. The process as claimed in claim 8, wherein the polymer has a number average molecular weight of 4000 to 200000.

* * * * *